No. 820,068. PATENTED MAY 8, 1906.
J. SHARPLES.
BURNER FOR OIL LAMPS.
APPLICATION FILED OCT. 3, 1905.
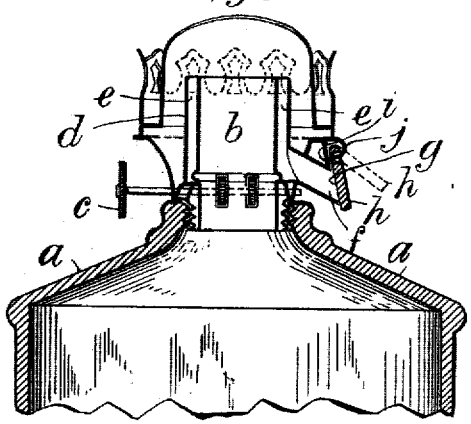
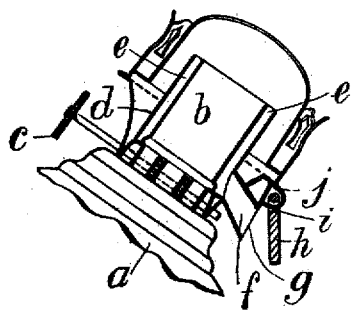
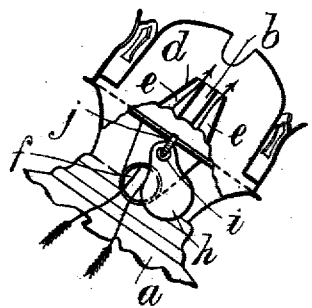
Witnesses.
Inventor.

UNITED STATES PATENT OFFICE.

JAMES SHARPLES, OF BIRMINGHAM, ENGLAND.

BURNER FOR OIL-LAMPS.

No. 820,068.  Specification of Letters Patent.  Patented May 8, 1906.

Application filed October 3, 1905. Serial No. 281,155.

*To all whom it may concern:*

Be it known that I, JAMES SHARPLES, lamp manufacturer, a subject of His Majesty the King of Great Britain and Ireland, residing at 699 Coventry road, Birmingham, England, have invented new and useful Improvements Connected with Certain Kinds of Burners for Oil-Lamps, of which the following is a specification.

This invention has reference to oil-lamp burners of the kind described in the specification in connection with my Letters Patent of the United States, No. 662,826, dated November 27, 1900. In this kind of burner means are provided for extinguishing the flame consisting of a funnel which is closed at the bottom and open at the top and surrounds the upper part of the wick-tube above the winder and is so shaped as to form a narrow opening all round the top of the wick-tube, this funnel having a side air-inlet tube at its lower part, which is closed by a suitable plug or valve. This air-inlet tube is closed when the lamp is burning, and then a large percentage of the oxygen from the interior of the funnel rises up and is consumed by the flame, so that in order to extinguish the lamp the air-inlet has to be opened quickly, so that the heated air which is contained in the funnel and which contains but a small percentage of oxygen then rises rapidly and impinging on the flame extinguishes it. Heretofore in practice the small air-inlet tube has been closed by a small cap connected thereto by a chain; but this is not altogether satisfactory, as it sometimes happens that the cap fits the tube too tightly, and then when the tube has expanded by the heat the cap cannot be removed quickly, and, moreover, the cap is liable to be lost, and then the lamp will not burn properly.

My present invention is directed to provide an improved device for quickly opening and closing the said air-inlet, which device cannot bcome detached from the air-inlet itself, and if the lamp be sufficiently tilted or upset the air-inlet is thereby automatically opened and the lamp extinguished.

I will describe my invention by referring to the accompanying drawings, on which—

Figure 1 is a sectional elevation of the burner and upper part of the oil vessel of a flat-wick oil-lamp constructed in accordance with the invention described in my prior Letters Patent, No. 662,826, and also provided with my present invention. Fig. 2 shows the same burner and upper part of the oil vessel tilted with the air-inlet tube opened; and Fig. 3 also shows the same burner tilted, but at right angles to the position shown by Fig. 2, this Fig. 3 also showing the air-inlet opened to extinguish the lamp.

The same reference-letters indicate the same parts in all the figures.

$a$ is the oil vessel. $b$ is the wick-tube. $c$ is the wick-winder. $d$ is the funnel, which according to my prior patent above referred to is provided round the wick-tube $b$ and extends to about the top of the same, the bottom of the funnel being closed, forming an air space or cavity $e$ round the wick-tube, which, as aforesaid, when the lamp is burning contains but a small percentage of oxygen. $f$ is the air-inlet tube, which communicates at one end with the cavity or space $e$ and is open at the other end $g$.

In carrying out my present invention I provide at the open end $g$ of the inlet-tube a flap-valve $h$, which by gravity is caused to lie against and close the open or outer end $g$ of the tube $f$. This outer end $g$ of the tube $f$ is cut off, as shown in Fig. 1, rather inclined to the vertical, so that the flap-valve $h$ is not quite vertical, but hangs and lies against and porperly closes the open end $g$ of the tube $f$. In the upper part of the flap-valve $h$ above the open end $g$ of the tube there is a hole $i$ in the valve, through which passes a wire loop $j$, fixed to the side of the burner, thus constituting a loosely-hinged connection of the valve $h$ to the burner: but the hole $i$ is made so large that the flap-valve $h$ can readily move in almost any direction. When the lamp is burning and it is desired to extinguish the flame, all that is necessary to be done is to lift the flap-valve $h$, as indicated by the dotted lines in Fig. 1, or to turn the flap-valve through a short distance sidewise, as shown in Fig. 3, so as to expose the open end $g$ of the tube, when the inrush of air through the tube $f$ and into the funnel will cause the bad air in the cavity of the funnel $d$ to rise up around the flame and extinguish it. Moreover, if the lamp be tilted to one side, as in Fig. 2 or Fig. 3, or be upset the lamp will be immediately extinguished, as the flap-valve $h$ in maintaining its vertical position causes the open end $g$ of the tube to be exposed, so that the air can rush in and extinguish the flame as aforesaid.

What I claim as my invention, and desire to secure by Letters Patent, is—

1. A burner comprising a wick-tube, an imperforated funnel surrounding the same so as to form an air-chamber, a passage leading to the lower part of said chamber and means closing said passage to the outside atmosphere, said means opening said passage automatically when the lamp is tilted or upset.

2. In an oil-lamp burner of the kind herein referred to which has a funnel closed at the bottom and surrounding the upper part of the wick-tube above the winder and forming a narrow opening all round the top of the wick-tube with a side air-inlet tube at the bottom of said funnel, the combination with said air-inlet tube and funnel of a flap-valve hanging loosely from a hinge above the inlet end of said tube so as to close the same and adapted to automatically open the passage when the lamp is tilted, substantially as set forth.

In testimony whereof I have signed my name to this specification in the presence of two subscribing witnesses.

JAMES SHARPLES.

Witnesses:
CHARLES BOSWORTH KETLEY,
THOMAS JOHN ROWE.